P. L. MARDIS.
CONTROL SYSTEM.
APPLICATION FILED SEPT. 21, 1916.
1,324,840.
Patented Dec. 16, 1919.
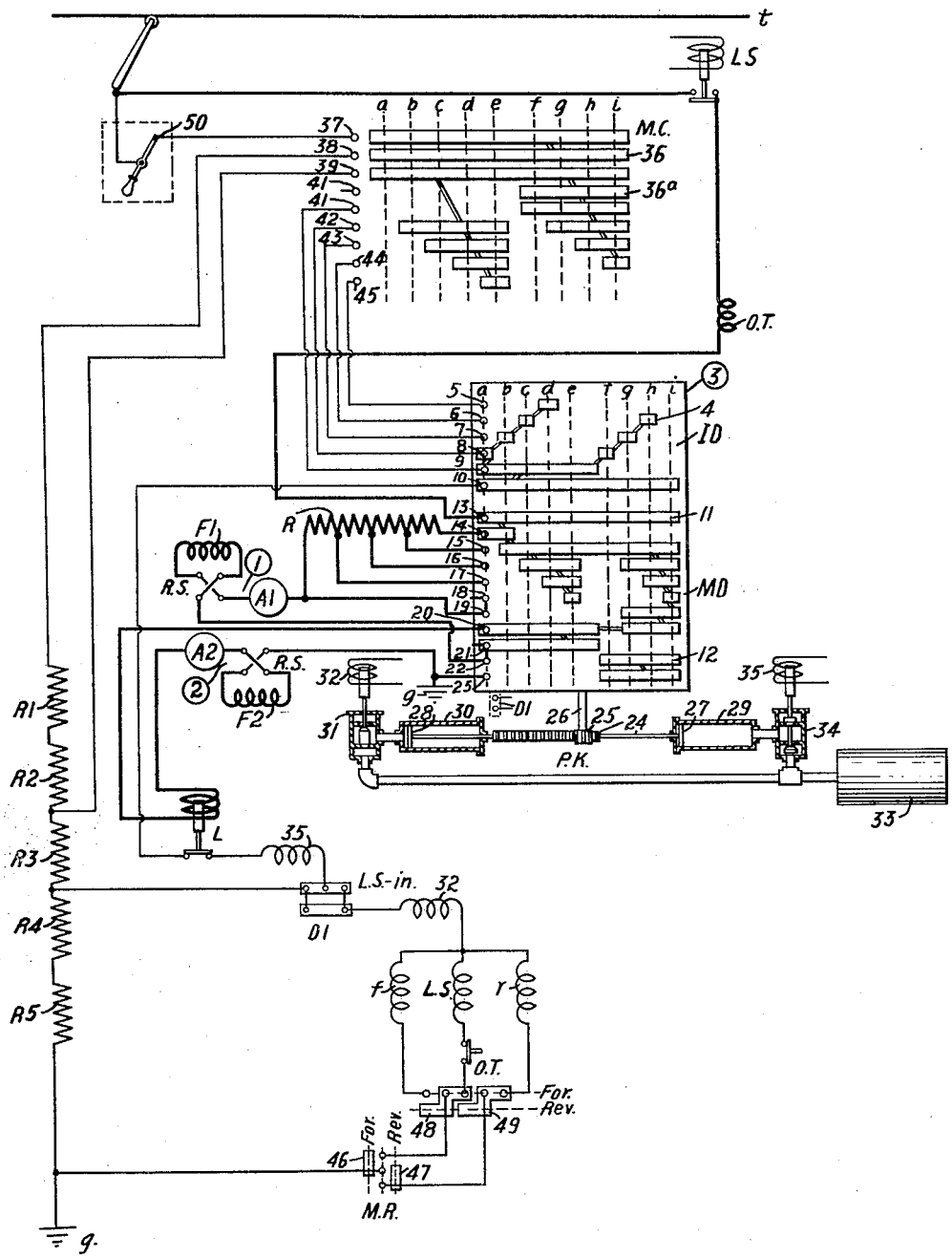
WITNESSES:
Fred. A. Lind.
W. B. Wells.
INVENTOR
Paul L. Mardis
BY
Wesley G. Carr
ATTORNEY

UNITED STATES PATENT OFFICE.

PAUL L. MARDIS, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,324,840.  Specification of Letters Patent.  Patented Dec. 16, 1919.

Application filed September 21, 1916. Serial No. 121,386.

*To all whom it may concern:*

Be it known that I, PAUL L. MARDIS, a citizen of the United States, and a resident of Wilkinsburg, in the county of Allegheny and State of Pennsylvania, have invented a new and useful Improvement in Control Systems, of which the following is a specification.

My invention relates to control systems for operating electric motors, and particularly to systems that are adapted to control the propelling motors of electric railway vehicles.

One object of my invention is to provide a control system for governing the operation of the apparatus contained therein by means of energy obtained from shunt circuits to resistors that are connected in series across a supply circuit.

Another object of my invention is to provide a control system embodying a pneumatically operated main controller that is governed by two magnet-valves, the coils of which magnet-valves are energized by being connected in shunt to certain resistors that are connected across the supply circuit.

More specifically my invention includes a number of motors which are adapted to be connected across the supply circuit by means of a line switch, a main controller, comprising an interlock drum and a main control drum, for connecting the motors in series and in parallel-circuit relation, an electro-pneumatic device, which is controlled by two magnet-valves, for governing the operation of the main controller, and means, comprising a master controller and said interlock drum, for connecting the coils of said magnet-valves, the coil of said line switch and the coils of the reversing switch in shunt circuit to certain of a plurality of resistors that are connected across the supply circuit.

In the accompanying drawing, the single figure is a diagrammatic view of a control system embodying my invention.

The control system illustrated in the accompanying drawing embodies two motors 1 and 2 which are provided, respectively, with armatures A1 and A2 and field windings F1 and F2, a main controller 3 for governing the operation of the motors and a line switch LS for connecting the motors in series with a resistor R across the supply circuit comprising conductors $t$ and $g$. The main controller comprises an interlock drum ID and a main control drum MD, the interlock drum embodies a movable contact segment 4 which is adapted to engage contact fingers 5 to 10, inclusive, when moved through positions $a$ to $i$, inclusive, and the main control drum embodies movable contact segments 11 and 12 which are adapted to engage contact fingers 13 to 23, inclusive, when moved through positions $a$ to $i$, inclusive.

An electro-pneumatic device PK is provided for operating the main controller 3. The device PK embodies a ratchet bar 24 which engages a pinion 25 that is mounted upon the shaft 26 of the main controller, and joined to the respective ends of the ratchet bar 24 are pistons 27 and 28 which operate within the cylinders 29 and 30. A standard magnet-valve 31 having an operating coil 32 is provided for connecting the cylinder 30 to a source of air supply 33, and an inverted magnet-valve 34 having an operating coil 35 is provided for connecting the cylinder 29 to the source of air supply 33. A standard magnet-valve is open to the atmosphere in its released position, whereas an inverted magnet-valve is connected to the air supply in its released position. Thus in the released positions of the magnet-valves 31 and 34, the cylinder 30 is connected to the atmosphere and the cylinder 29 is connected to the air supply 33, and in the operating positions of the two magnet-valves, the cylinder 30 is connected to the source of air supply and cylinder 29 is connected to the atmosphere.

A master controller MC, comprising movable contact segments 36 and 36ª, is adapted to engage contact fingers 37 to 45, inclusive, when moved to positions $a$ to $i$, inclusive, and in combination with the interlock drum ID, to connect the coil of the line switch LS, the coils 32 and 35 of the magnet-valves 31 and 34, and the coils $f$ and $r$ in various relations in shunt to resistors R1 to R5, inclusive, which are connected across the supply conductors $t$ and $g$.

A reversing switch RS of a usual construction is provided for reversing the relations of the armatures A1 and A2, relative to the field windings F1 and F2 to reverse the direction of rotation of the motors 1 and 2. The reversing switch RS is controlled by a master reverser MR which governs the energization of the reversing coils $f$ and $r$ by means of the contact segments 46, 47, 48 and 49.

The coil of an overload trip switch OT and the coil of a limit switch L are inserted in the circuit of the motors 1 and 2 to prevent the overloading of the motors. A switch 50 is provided for connecting the master controller MC across the supply conductors $t$ and $g$.

The main controller 3 is provided with an interlock switch D1 for connecting the coil 32, the coil of the line switch LS, and the reversing coils $r$ and $f$ to a point intermediate the resistors R3 and R4, in position $a$ of the main controller, and in the remaining positions of the main controller, an interlock switch LS—in is provided for not only establishing a closed circuit through the coil 32 and the coil of the line switch LS, but also for establishing a circuit through the coil 35 of the magnet-valve 34.

With the control system in the position shown and the master reverser moved to its forward position, the operation of the system when the master controller is moved through positions $a$ to $i$, inclusive, is as follows: When the master controller is moved to position $a$, a circuit is completed through the resistors R1 to R5, inclusive, which may be traced from the supply conductor $t$ through the switch 50, contact fingers 37 and 38, which are bridged by the contact segments 36, and the resistors R1, R2, R3, R4 and R5, to the ground conductor $g$. A circuit is completed through the coil 32 of the standard magnet-valve 31 and the coil of the line switch LS, which may be traced from one terminal of the resistor R3 through the interlock D1, the coil 32, the coil of the line switch LS, overload trip switch OT, and the contact segments 48 and 46, to the ground conductor $g$. The magnet-valve 31 is operated to admit air pressure to the cylinder 30, but no movement of the apparatus PK is effected at this time as the cylinder 29 is also connected to the air source 33 by means of the magnet-valve 34. The line switch LS is operated to connect the motors 1 and 2 in series across the supply conductors $t$ and $g$, by means of a circuit which may be traced from the conductor $t$, through the line switch LS, coil of the overload trip switch OT, contact fingers 13 and 14, which are bridged by the movable contact segment 11, resistor R, armature A1, field winding F1, contact fingers 21 and 20, which are bridged by the contact segment 11, coil of the limit switch L, armature A2, and field winding F2, to the ground conductor $g$.

When the master controller is moved to position $b$, a circuit is completed through the coil 35 of the magnet-valve 34, which may be traced from one terminal of the resistor R2 through contact finger 39, movable contact segment 36ª, contact finger 42, contact fingers 8 and 10, which are bridged by the movable contact segment 4, limit switch L, coil 35, and the interlock switch LS—in, to one terminal of the resistor R3. The magnet-valve 34 is now operated by reason of the coil 35 being energized and the cylinder 29 is disconnected from the source 33 and is connected to the atmosphere. The cylinder 30 being connected to the air source and the cylinder 29 being released of the air pressure contained therein, the main controller 3 is advanced to position $b$ where the circuit of the coil 35 is broken by reason of the disengagement of the contact finger 8 with the movable contact segment 4. The release of the magnet-valve 34 again admits air pressure to the cylinder 29 and holds the main controller 3 until the coil 35 is again energized by means of the master controller MC. In position $b$ of the main control drum, a portion of the resistor R is excluded from the circuit of the motors 1 and 2 by reason of the engagement of the contact finger 15 with the movable contact segment 11.

In positions $c$, $d$ and $e$ of the master controller, the coil 35 of the magnet-valve 34 is intermittently operated in the manner above set forth to advance the main controller 3 in a step-by-step manner to position $e$ and thus exclude the resistor R from the circuit of the motors 1 and 2. Between position $e$, which is the last series position and position $f$, which is the first parallel position of the master controller, a circuit is completed for effecting the transition of the main controller 3 from position $e$ to position $f$, which may be traced from one terminal of the resistor R3 through contact finger 39, contact segment 36ª, contact finger 41, contact fingers 9 and 10, which are bridged by the contact segment 4, limit switch L, coil 35, and the interlock switch LS—in, to the other terminal of the resistor R3. The main controller 3 is moved to position $f$ by means of the device PK, where the contact finger 9 disengages contact with the movable contact segment 4 to break the circuit of the coil 35 and thus release the magnet-valve 34 and prevent further movement of the controller.

In position $f$ of the main controller 3, the motors 1 and 2 are connected in parallel across the supply conductors $t$ and $g$ through a circuit including the resistor R.

When the master controller is moved through positions $g$, $h$ and $i$, the main controller 3 is advanced in a step-by-step manner by the apparatus PK as above set forth to exclude the resistor R from the circuit of the motors and to connect the same in full parallel relation across the supply conductors $t$ and $g$.

I do not wish to be restricted to the specific control system or the arrangement of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with a supply circuit, a plurality of motors, a main controller for connecting said motors in series and in parallel-circuit relation, and a line switch for connecting the motors across the supply circuit, of a pneumatic device for operating said main controller, magnet-valves for governing the operation of said pneumatic device, and means for automatically connecting the coil of one of said magnet-valves and the coil of the line switch in series relation upon predetermined operating conditions.

2. In a system of control, the combination with a supply circuit, a plurality of motors, a line switch for connecting the motors across the supply circuit, a main controller for connecting said motors in series and in parallel-circuit relation, and two magnet-valves having coils for governing the operation of said controller, of means for energizing the coil of said line switch and the coil of one of said magnet-valves in the same series circuit and for energizing the coil of the second magnet-valve in order to operate the motors.

3. In a system of control, the combination with a supply circuit, a plurality of motors, a line switch for connecting the motors across the supply circuit, a main controller for governing the operation of said motors, and an electro-pneumatic device for operating the main controller, of a plurality of resistors connected across said supply circuit, a plurality of magnet-valves for controlling the operation of said electro-pneumatic device, and means comprising a master controller for connecting a circuit comprising the energizing windings of said line switch and one of said magnet-valves in parallel relation to certain of said resistors and for intermittently connecting the other one of said magnet-valves in shunt circuit to certain other resistors in order to operate the main controller in a step-by-step manner and control the operation of the motors.

4. In a system of control, the combination with a supply circuit, a plurality of resistors connected across said supply circuit, a line switch for connecting the motors across the supply circuit, and a main controller for governing the operation of said motors, of two magnet-valves for governing the operation of said main controller, each of said magnet-valves provided with an operating coil, means for connecting the coil of one of said magnet-valves and the coil of said line switch in series circuit around certain of said resistors, and means for connecting the coil of the other magnet-valve in shunt around one of said resistors, whereby the motors may be connected across the supply circuit and be accelerated in a step-by-step manner.

5. In a system of control, the combination with a supply circuit, a plurality of resistors connected across said supply circuit, a plurality of motors, and a main controller for governing the operation of said motors, of a line switch and a magnet-valve having the operating coils thereof connected in a series circuit that is disposed in parallel relation to certain of said resistors, said line switch being adapted to connect the motors across the line circuit, a second magnet-valve connected in shunt to another one of said resistors, and means for controlling the operation of said magnet-valves to govern the operation of said main controller.

6. In a system of control, the combination with a plurality of motors, a main controller for governing the operation of said motors in series and in parallel-circuit relation, a line switch having an operating coil, and two magnet-valves having operating coils for governing the operation of said controller, of means comprising two coils for reversing the direction of rotation of said motors, and means for energizing the coil of the line switch and one of said reversing coils in one series circuit and for automatically excluding said reversing coil from circuit and inserting one of said magnet-valve coils in circuit.

7. In a system of control, the combination with a supply circuit, a plurality of resistors connected across said supply circuit, a plurality of motors, means comprising a main controller for governing the operation of said motors in series and in parallel-circuit relation, and a pneumatic device for operating said main controller, of two magnet-valves for governing the operation of said pneumatic device, a line switch for connecting said motors across the supply circuit, and a master controller for maintaining the coil of one of said magnet-valves and the coil of said line switch in a series circuit that is disposed in parallel relation to certain of said resistors when the master controller is in an operative position, and for intermittently connecting the coil of the second one of said magnet-valves in shunt of certain other of said resistors when the master controller is moved through its various operative positions.

8. In a system of control, the combination with a supply circuit, a plurality of resistors connected across said supply circuit, a main controller, a plurality of motors governed by said controller, a line switch having an energizing coil, a pneumatic device for operating said main controller, and two magnet-valves having energizing coils for controlling the operation of said pneumatic device, of means comprising two coils for reversing the direction of rotation of said motors and means for energizing the coil of the line switch and one of said reversing coils in the same series circuit and in shunt to certain of said resistors and for automatically excluding said reversing coil from circuit and inserting one of said magnet-valve coils in circuit.

9. In a system of control, the combination with a supply circuit, a plurality of resistors connected across said supply circuit, a plurality of motors and a main controller for governing the operation of said motors, of two magnet-valves for governing the operation of said main controller, each of said magnet-valves provided with an operating coil, a motor reversing switch provided with two operating coils and means for connecting the coil of one of said magnet-valves and a coil of said reversing switch in a series circuit that is connected around certain of said resistors and for connecting the coil of the other magnet-valve in shunt around certain other of said resistors.

10. In a system of control, the combination with a supply circuit, a plurality of motors, a main controller for governing the operation of said motors and a line switch for connecting the motors across the supply circuit, of means comprising two magnet-valves for governing the operation of said controller, each of said magnet coils having an operating coil, and means for energizing the coil of said line switch and the coil of one of said magnet-valves in one series circuit and for intermittently energizing the coil of the second magnet-valve in a second circuit to connect the motors across the supply circuit and operate the main controller in a step-by-step manner.

In testimony whereof I have hereunto subscribed my name this 7th day of Sept., 1916.

PAUL L. MARDIS.